United States Patent
Golo (10) Patent No.: US 8,573,689 B2
(45) Date of Patent: Nov. 5, 2013

(54) RETRACTABLE VEHICLE SEAT CLOTHES HANGING BAR

(76) Inventor: Oleks Golo, East Stroudsburg, PA (US)

(*) Notice: Subject to any disclaimer, the term of this patent is extended or adjusted under 35 U.S.C. 154(b) by 176 days.

(21) Appl. No.: 13/080,652

(22) Filed: Apr. 5, 2011

(65) Prior Publication Data

US 2012/0168475 A1    Jul. 5, 2012

Related U.S. Application Data (60) Provisional application No. 61/428,198, filed on Dec. 29, 2010.

(51) Int. Cl.
*A47C 7/62* (2006.01)
*B60R 7/10* (2006.01)

(52) U.S. Cl.
USPC ..................... 297/188.03; 224/275

(58) Field of Classification Search
USPC ........... 224/275; 297/188.03, 188.04, 188.05, 297/188.21
See application file for complete search history.

(56) References Cited

U.S. PATENT DOCUMENTS

| | | | | |
|---|---|---|---|---|
| 2,262,581 A | * | 11/1941 | Gonczy | 297/188.03 |
| 4,711,488 A | * | 12/1987 | Ohanessian | 297/188.03 |
| 6,443,523 B1 | * | 9/2002 | Reitze | 297/188.03 |
| 7,063,381 B2 | * | 6/2006 | Scahill et al. | 297/188.03 |
| 2003/0184134 A1 | * | 10/2003 | Liu | 297/188.03 |
| 2006/0261229 A1 | | 11/2006 | Hirota | |
| 2012/0200126 A1 | * | 8/2012 | Najjar | 297/188.03 |

FOREIGN PATENT DOCUMENTS

| | | |
|---|---|---|
| JP | 42-011739 Y | 6/1942 |
| JP | 54-117334 U | 8/1979 |
| JP | 55-82983 U | 6/1980 |
| JP | 4-200509 A | 7/1992 |
| JP | H07-11960 U | 8/1993 |
| JP | 9-182646 A | 7/1997 |
| JP | 2004-329346 A | 11/2004 |
| JP | 2005-237454 A | 9/2005 |

* cited by examiner

*Primary Examiner* — Milton Nelson, Jr.
(74) *Attorney, Agent, or Firm* — QuickPatents; Kevin Prince (57) ABSTRACT

Disclosed is a support mechanism for at least one garment or garment hanger and for integration into a top surface of a vehicle seat. A substantially horizontal and rigid support bar is adapted for providing greater area of support than a traditional vehicle ceiling hook. At least one substantially vertical support post is fixed with the support bar. An enclosure well is adapted to receive all but a top surface of the support bar therein. An open side of the enclosure well is adapted for mounting flush with the top surface of the vehicle seat. At least one post receiver is fixed to a bottom portion of the enclosure well and is adapted to receive the at least one support post therein. Each post receiver preferably contacts the support post with a friction fit such that the support bar and the support post are selectively vertically positionable.

17 Claims, 6 Drawing Sheets

RETRACTABLE VEHICLE SEAT CLOTHES HANGING BAR

CROSS-REFERENCE TO RELATED APPLICATIONS

This application claims the benefit of U.S. Provisional Patent Application 61/428,198, filed on Dec. 29, 2010, and incorporated herein by reference.

STATEMENT REGARDING FEDERALLY SPONSORED RESEARCH AND DEVELOPMENT

Not Applicable.

FIELD OF THE INVENTION

This invention relates to support devices, and more particularly to a garment support device for a vehicle.

DISCUSSION OF RELATED ART

Support hooks in vehicles for supporting garments or garment hangers are well known, and are typically installed proximate the ceiling of the passenger compartment so that the garments will be suspended and free from contacting other surfaces. However, using such hooks can be cumbersome, particularly when standing outside of the vehicle. Attempting to hang a garment directly on a vehicle ceiling hook is difficult without the benefit of a garment hanger. Furthermore, when a garment is hung directly on a ceiling hook, the single point of contact creates an undesirable impression in the garment as the entire weight of the garment is pressing against the ceiling hook.

Therefore, there is a need for a garment hanging support device that can be easily accessed from a standing position while outside of the vehicle. Such a needed invention would provide an aesthetically-pleasing retracted position when not in use, and would be easily deployable to allow suspension of the garment behind a passenger or driver's front seat, thereby allowing the garment to be suspended thereby while not contacting other surfaces. Such a needed device provides for garments suspended by such a device to be positioned non-obtrusively and out-of-sight of the driver of the vehicle. The needed device would further allow the garment to be suspended without the need for a garment hanger and provide multiple points of contact to minimize unsightly impressions on the garment. The present invention accomplishes these objectives.

SUMMARY OF THE INVENTION

The present device is a support mechanism for at least one garment or garment hanger and for integration into a top surface of a vehicle seat. The support mechanism is adapted to support the weight of at least one garment, such as a suit jacket, pants, coat, or the like. A substantially horizontal and rigid support bar is adapted for supporting the at least one garment, and includes at least a top surface, a bottom surface, and a peripheral edge. The support bar is adapted to support a garment without the need for a garment hanger, though a garment hanger may be used if desired. The top surface of the support bar may include a plurality of transverse grooves adapted for retaining one of the garment hangers therein by gravity or friction, for example. Alternately, or in addition, the bottom surface of the support bar may include a plurality of downwardly-projecting hooks or loops, each for receiving one of the garment hangers. At least one substantially rigid, vertical support post is fixed at a top end thereof with the bottom surface of the support bar.

An enclosure well is adapted to receive all but the top surface of the support bar therein, an open side of the enclosure well adapted for mounting flush with the top surface of the vehicle seat. The open side of the enclosure well is adapted for complimentary appearance against the top surface of the vehicle seat, such as for example being a black or chrome-plated material around the perimeter of the open side.

At least one post receiver is fixed to a bottom portion of the enclosure well and is adapted to receive a bottom end of one of the at least one support post therein. Each post receiver contacts the support post with a friction fit such that the support bar and the support post are selectively vertically positionable. At least one of the post receivers may include a clamp lock adapted to fix the support post in position with respect to the post receiver until an actuator thereof is manually actuated to release the support post to allow vertical movement thereof. The support post may further include at least one locking groove for cooperation with the clamp lock.

In an alternate embodiment of the invention, a pair of horizontal support bars are each fixed at a proximal end thereof with the top end of the support post at a pivot mechanism. In such an embodiment, distal ends of each support bar are flush with the top surface of the vehicle seat when the support post is lowered into its stowed position.

In use, with the enclosure well mounted flush with the top surface of the vehicle seat, the support bar may be lowered to a stowed position flush with the top surface of the vehicle seat, and then placed into a deployed position to provide a support for the at least one garment or garment hanger thereon.

The present invention is a garment hanging support device that can be easily accessed from a standing position while outside of the vehicle. The present device allows for an aesthetically-pleasing retracted position when not in use, and is easily deployable to allow suspension of the garment behind a passenger or driver's front seat, thereby allowing the garment to be suspended thereby while not contacting other surfaces. The invention provides for garments to be suspended non-obtrusively and out-of-sight of the driver of the vehicle, even away from the line of sight of rear-view and side mirrors of the vehicle. The invention further allows garments to be suspended without the need for a garment hanger and provides more points of contact than a simple ceiling hook. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

Figures 1, 2:
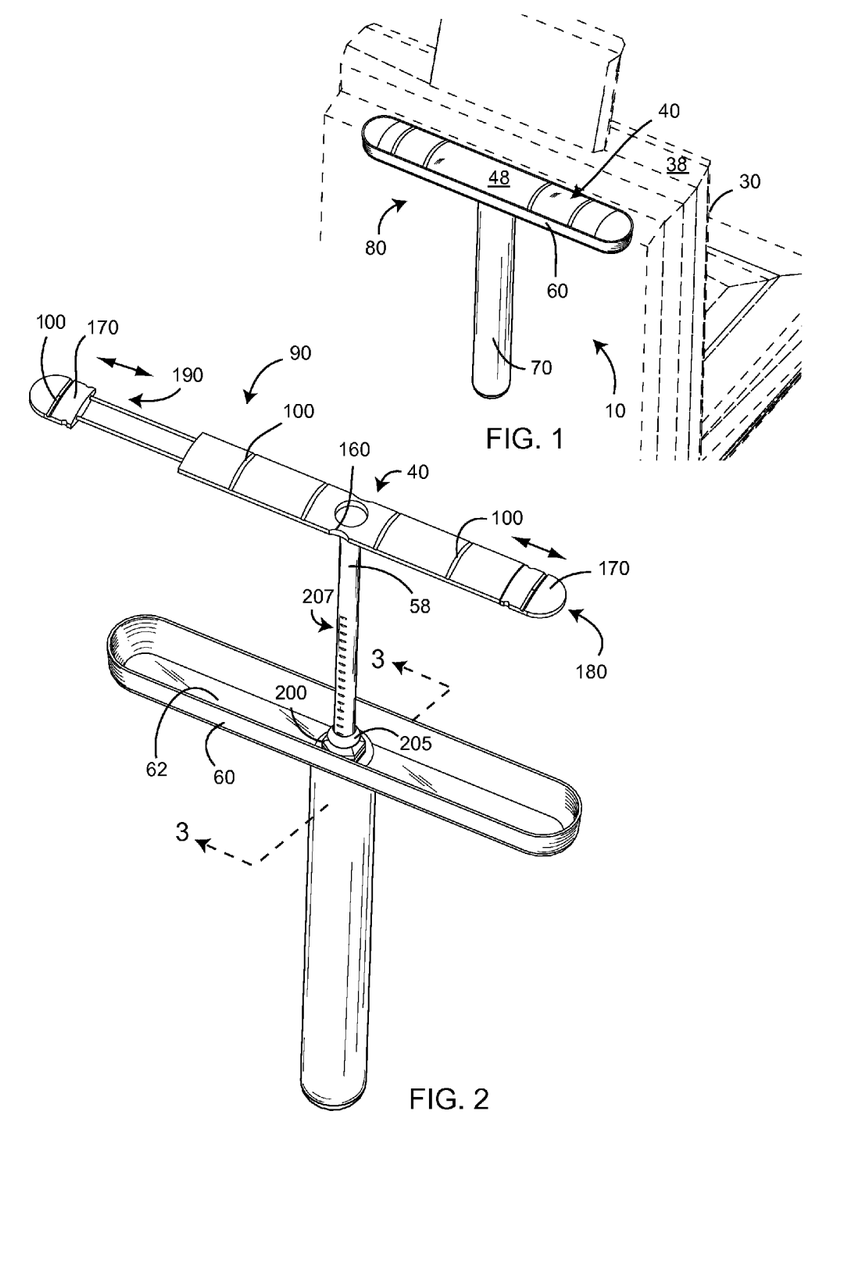
FIG. 1 is a perspective view of the invention, illustrated as installed in a vehicle seat.
FIG. 2 is a perspective view thereof, illustrated with a support bar of the invention in a deployed position.
Figure 3:
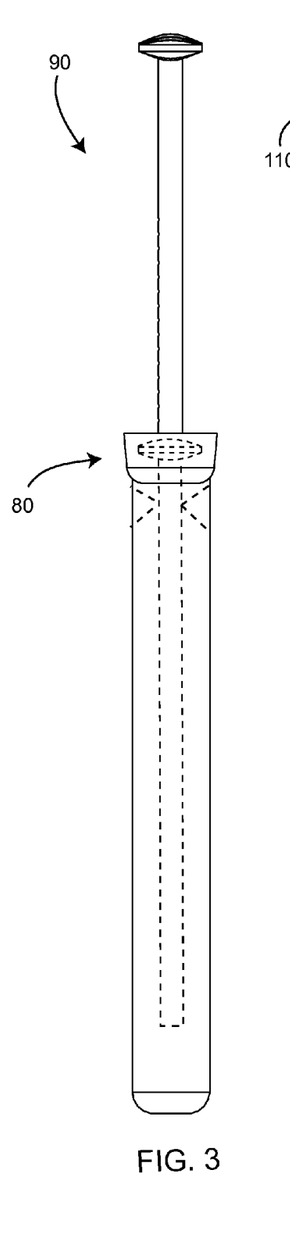
FIG. 3 is a left-side elevational view of FIG. 2.
Figure 6:
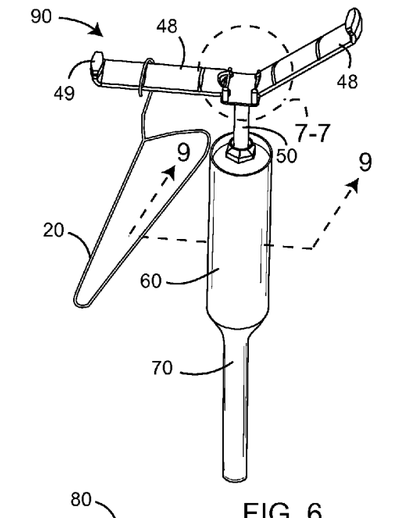
FIG. 6 is a perspective view of an alternate embodiment of the invention.
Figure 7:
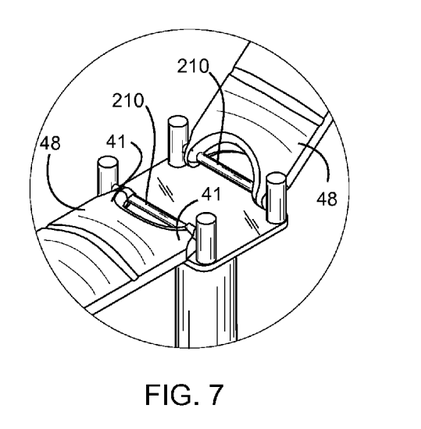
FIG. 7 is an enlarged perspective view taken generally alone lines 7-7 of FIG. 6.

FIGS. 1 and 2 illustrate a support mechanism 10 for at least one garment 25 (FIG. 16), such as a suit jacket, pants, coat, or the like, or at least one garment hanger 20 (FIG. 6) and for integration into a top surface 38 of a vehicle seat 30. The support mechanism 10 is adapted to support the weight of at least one garment 25 directly or suspended from each garment hanger 20. Such a vehicle may be an automobile, as illustrated, or a bus, van, airplane, train, or other vehicle (not shown).

Figure 16:
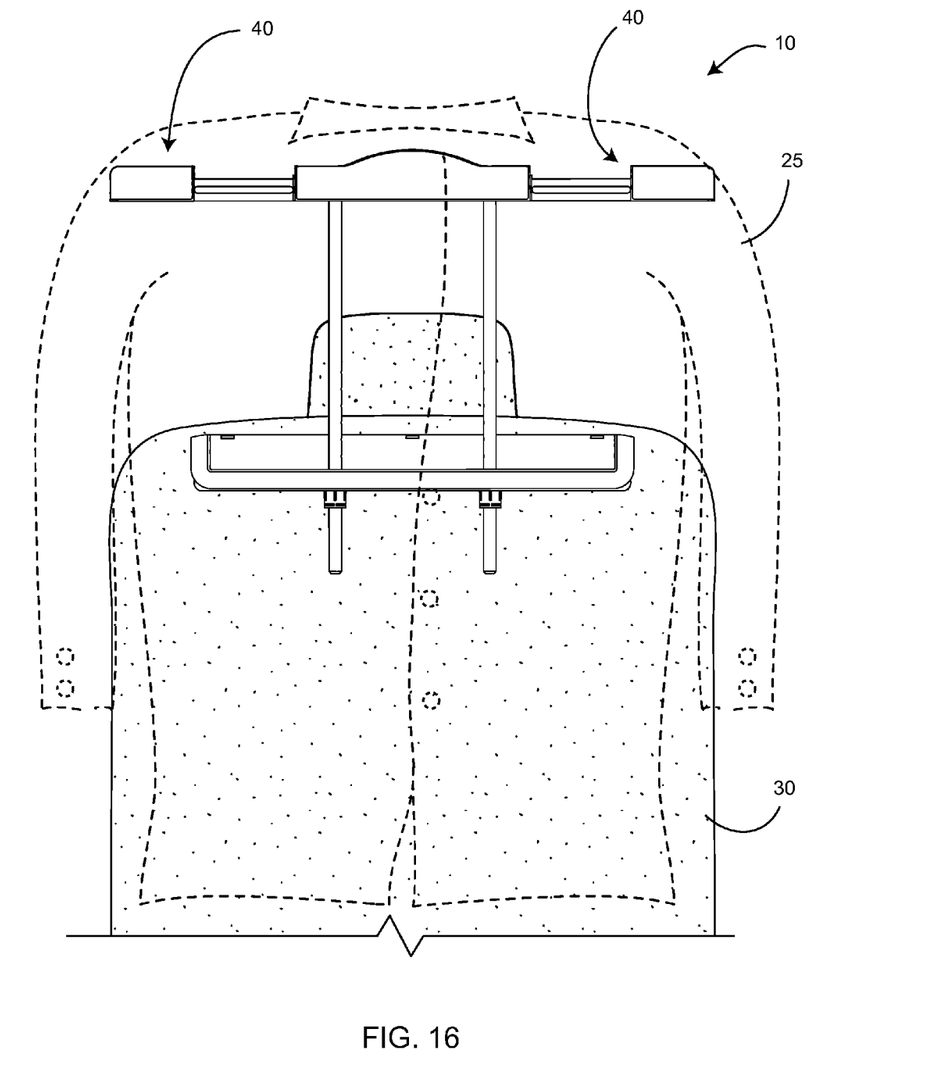
FIG. 16 is a perspective view of the invention, illustrated as installed in a vehicle seat.

A substantially horizontal and rigid support bar 40 is adapted for supporting the at least one garment 25 or garment hanger 20, and includes at least a top surface 48, a bottom surface 42, and a peripheral edge 45. The support bar 40 is adapted to support a garment 25 without the need for a garment hanger 20, as illustrated in FIG. 16, though a garment hanger 20 may be used if desired. The support bar 40 provides a greater area of support than the singular point of contact of a traditional vehicle ceiling hook (not shown).

Figure 5:
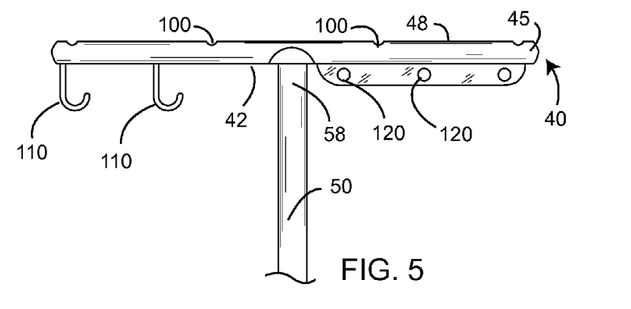
FIG. 5 is a partial front elevational view of a vertical support post and the support bar.

The top surface 48 of the support bar 40 may include a plurality of transverse grooves 100 adapted for retaining one of the garment hangers 20 therein by gravity or friction, for example. Alternately, or in addition, the bottom surface 42 of the support bar 40 may include a plurality of downwardly-projecting hooks 110 (FIG. 5) or loops 120, each for receiving one of the garment hangers 20. In one embodiment the upper surface 48 of the support bar has a polished wood appearance, the support bar 40 either being made from wood or having a wood veneer top surface 48. Alternately the support bar 40 may be made with a chrome or other metallic finish, a plastic finish, a leather finish, or the like, such that the top surface 48 of the support bar 40 has a complimentary appearance when flush with the top surface 38 of the vehicle seat 30. In another embodiment, the top surface 48 of the support bar 40 includes a finish, such as a non-slippery leather finish, that provides greater friction to facilitate the securing of the garment 25 when placed directly on the support bar 40.

Figure 12:
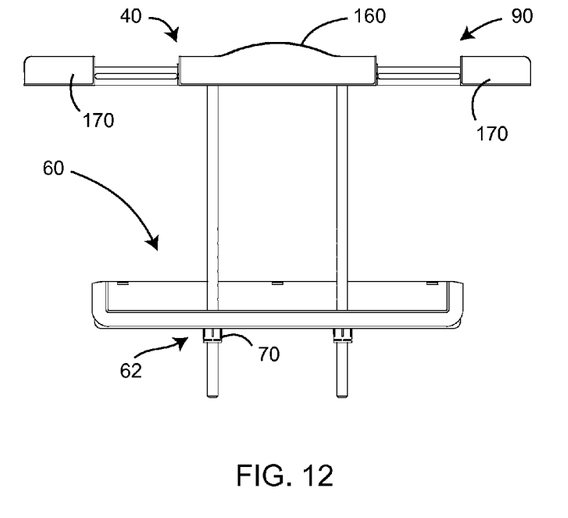
FIG. 12 is a rear elevational view of the invention in a deployed position.
Figure 13:
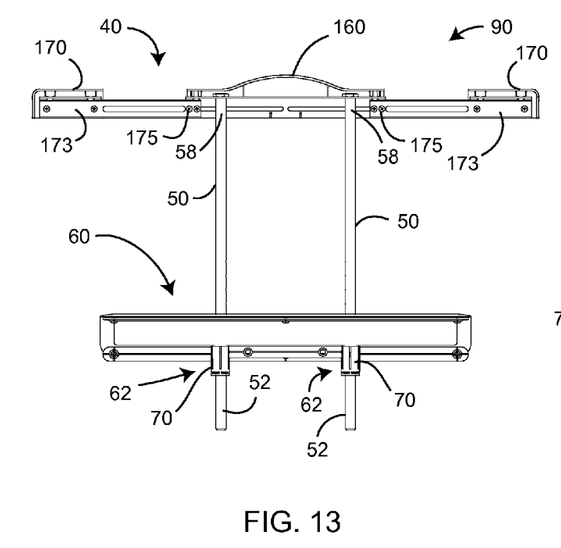
FIG. 13 is a front elevational view of the invention in a deployed position.
Figure 15:
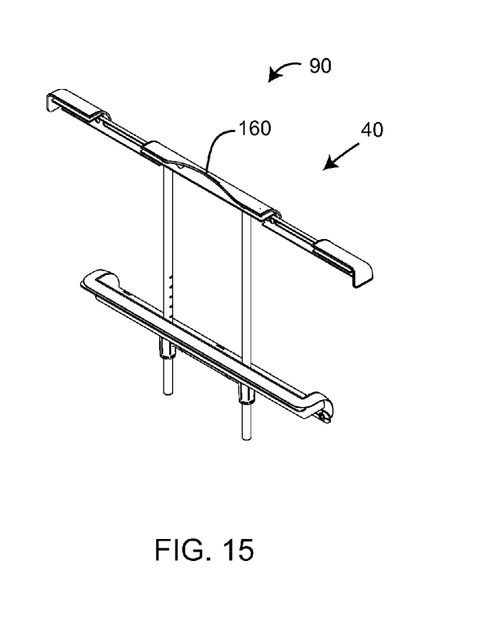
FIG. 15 is a perspective view of the invention in a deployed position.

The support bar 40 may further include at least one extension segment 170 that is extendible between a retracted position 180 and an extended position 190 (FIG. 2). Each extension segment 170 is adapted to support at least one garment 25 thereon, and can be extended to better support each garment 25 depending on the size and nature of each garment 25. Preferably, the support bar 40 includes two extension segments 170 on opposite ends, as illustrated in FIGS. 12 and 13. In one preferred embodiment, with each extension segment 170 extended, the support bar 40 is approximately 18 inches wide, approximately the width of a standard garment hanger. Each extension segment 170 is also adapted to support at least one of the garment hangers 20 thereon, and can be extended when multiple garment hangers 20 are to be supported with the support mechanism 10. Such an extension segment 170 may slide back and forth between the retracted and extended positions 180,190, as illustrated in FIGS. 13 and 15, or pivot at a hinge (not shown) between the retracted and extended positions 180,190, for example.

In one embodiment illustrated in FIG. 13, each extension segment 170 includes a sliding plate 173. The sliding plate 173 allows each extension segment 170 to slide in or out along the support bar 40. Each sliding plate 173 may further include at least one screw stop 175 to prevent each extension segment 170 from accidentally being removed.

Preferably, Teflon or Teflon-type material (not shown) is placed between each sliding plate 173 and the support bar 40, facilitating the sliding action of each extension segment 170. The sliding action and the tension can be adjusted by tightening or loosening each screw stop 175.

At least one substantially rigid, vertical support post 50 is fixed at a top end 58 thereof with the bottom surface 42 of the support bar 40. The top end 58 of each support post 50 may be embedded through the bottom surface 42 of the support bar 40, held thereto with at least one mechanical fastener, for example, or include a screw thread (not shown) and be screwed into a threaded aperture (not shown) traversing the bottom surface 42 of the support bar 40.

An enclosure well 60 is adapted to receive all but the top surface 48 of the support bar 40 therein, an open side 68 of the enclosure well 60 adapted for mounting flush with the top surface 38 of the vehicle seat 30. Such an enclosure well 60 may be made from plastic injection-molded material, for example, or from a chrome or other metallic material, or the like. The open side 68 of the enclosure well 60 is adapted for complimentary appearance against the top surface 38 of the vehicle seat 30, such as for example being a black or chrome-plated material around the perimeter of the open side 68. The enclosure well 60 may be fixed within the vehicle seat 30 by any suitable mechanical fastening means, such as by sewing, for example, or by additional mechanical fasteners, or the like.

Figures 17, 18:
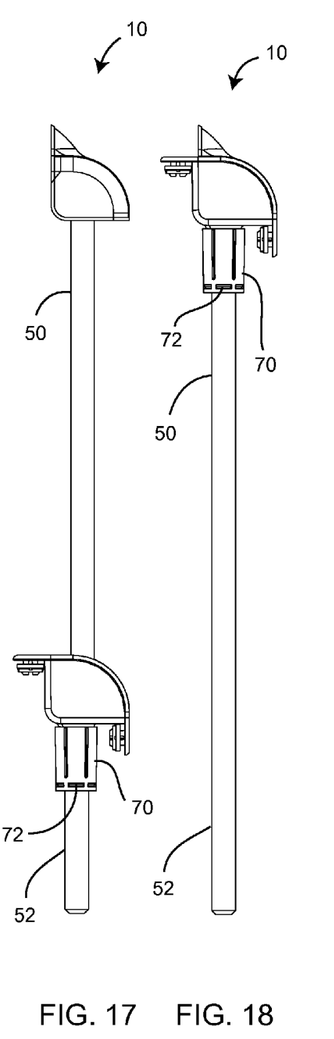
FIG. 17 is a left-side elevational view of the invention in a deployed position.
FIG. 18 is a left-side elevational view of the invention in a stowed position.

At least one post receiver 70 is fixed to a bottom portion 62 of the enclosure well 60 and is adapted to receive a bottom end 52 of one of the at least one support post 50 therein. Each post receiver 70 contacts the support post 50 with a friction fit such that the support bar 40 and the support post 50 are selectively vertically positionable. In another embodiment, each post receiver 70 includes an O-ring 72 providing cushioned pressure on each support post 50 allowing the support bar 40 to slide up or down to a desired height, as illustrated in FIGS. 17 and 18. In one embodiment, the enclosure well 60 is integrally formed with each post receiver 70, such as with injection molded plastic materials, for example. In another embodiment, the enclosure well 60 is made of a tray and a trim plate, whereby the trim plate is attached to the vehicle seat 30 and the tray snaps into or is otherwise frictionally held by the trim plate.

Figure 4:
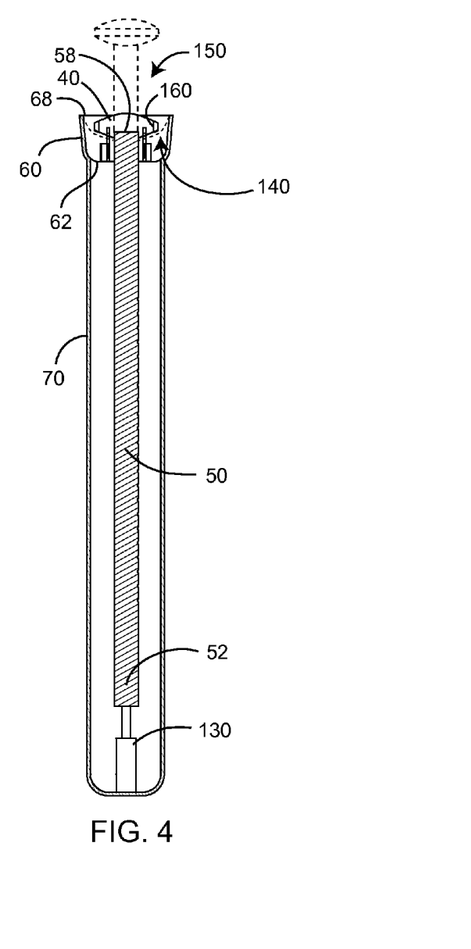
FIG. 4 is a cross-sectional view of the invention, taken along lines 4-4 of FIG. 2, but illustrated with the support bar in a retracted position.

Each post receiver 70 may further include a mechanical toggle lock mechanism 130 (FIGS. 4, 8 and 9) that toggles between a lowered position 140 corresponding to the top surface 48 of the support bar 40 being flush with the top surface 38 of the vehicle seat 30, and a raised position 150 corresponding to the top surface 48 of the support bar 40 being raised above the top surface 38 of the vehicle seat 30 for allowing gripping of the support bar 40, such as by gripping between one's thumb and forefinger, for example. Thus to move the toggle lock mechanism 130 from the lowered position 140 to the raised position 150, the support bar 40 may be depressed into the enclosure well 60 such that the top surface 48 of the support bar 40 is moved lower than the plane of the top surface 38 of the vehicle seat 30, thereby toggling the toggle lock mechanism 130 to raise each support post 50 and support bar 40 to a position above the top surface 38 of the vehicle seat 30.

Figure 10:
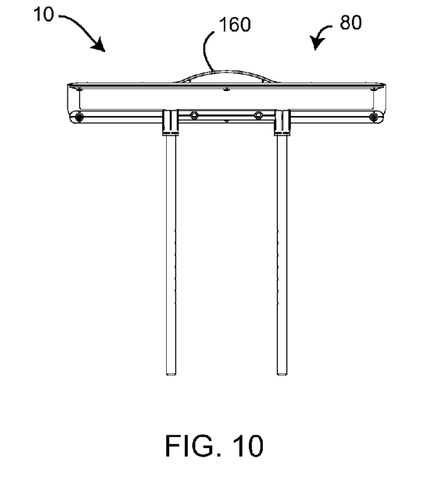
FIG. 10 is a rear elevational view of the invention in a stowed position.
Figure 11:
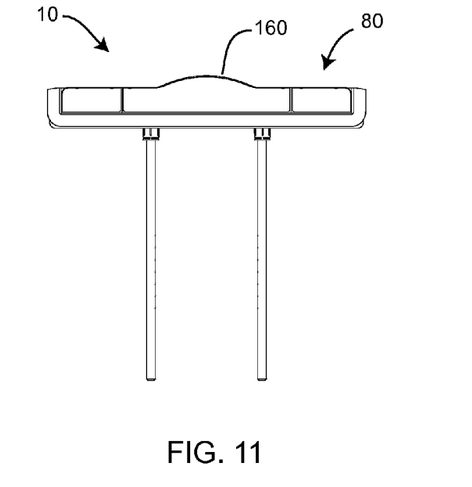
FIG. 11 is a front elevational view of the invention in a stowed position.

Then, to move the toggle lock mechanism 130 from the raised position 150 to the lowered position 140, the support bar 40 is again depressed below the top surface 38 of the vehicle seat 30. Such a toggle lock mechanism 130 includes a spring and a gear or lever mechanism that is known in the art, and is often used for cabinet doors and drawers and the like. Alternately, so-called "soft-close" type toggle lock mechanisms 130 may be used such that lowering the support bar 40 from the deployed position 90 to the raised position 150 results in the toggle lock 130 "soft-closing" so that after a time the top surface 48 of the support bar 40 assumes a coplanar position with respect to the top surface 38 of the vehicle seat 30. The support bar 40 may further include at least one finger section 160 to facilitate such manual gripping and raising or lowering of the support bar 40 (FIGS. 2, 10 and 11).

At least one of the post receivers 70 may include a clamp lock 200 (FIG. 2) adapted to fix the support post 50 in position with respect to the post receiver 70 until an actuator 205 thereof is manually actuated to release the support post 50 to allow vertical movement thereof. The support post 50 may further include at least one locking groove 207 for cooperation with the clamp lock 200.

Figure 14:
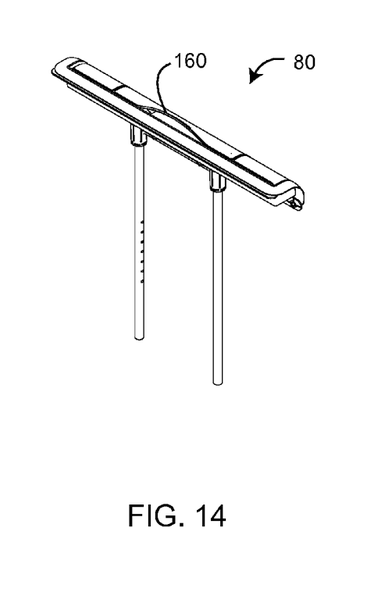
FIG. 14 is a perspective view of the invention in a stowed position.

In use, with the enclosure well 60 mounted flush with the top surface 38 of the vehicle seat 30, the support bar 40 may be lowered to a stowed position 80 (FIGS. 1 and 14) flush with the top surface 38 of the vehicle seat 30, and then placed into a deployed position 90 (FIGS. 2 and 15) to provide a support for the at least one garment 25 or garment hanger 20 thereon.

Figure 8:
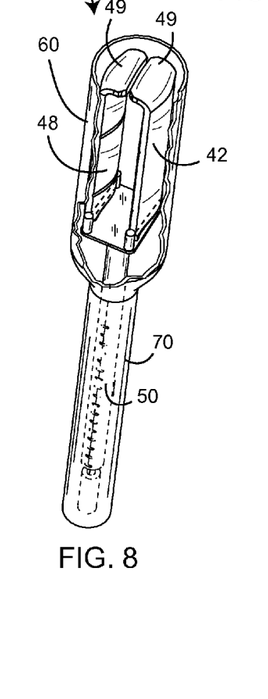
FIG. 8 is a perspective cut-away view of FIG. 6, illustrated with a pair of support bars folded into the retracted position.
Figure 9:
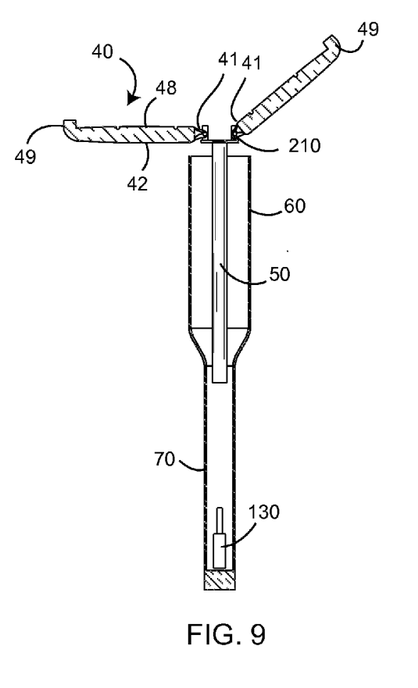
FIG. 9 is a cross-sectional view of the alternate embodiment, taken generally along lines 9-9 of FIG. 6.

In an alternate embodiment of the invention, illustrated in FIGS. 6-9, a pair of horizontal support bars 40 are each fixed at a proximal end 41 thereof with the top end 58 of the support post 50 at a pivot mechanism 210. In such an embodiment, distal ends 49 of each support bar 40 are flush with the top surface 38 of the vehicle seat 30 when the support post 50 is lowered into its stowed position 80 (FIG. 8).

While a particular form of the invention has been illustrated and described, it will be apparent that various modifications can be made without departing from the spirit and scope of the invention. For example, the shape of the support bar 40 may be altered from those shown in the drawings. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A support mechanism for at least one garment or garment hanger and for integration into a top surface of a vehicle seat, comprising:

a substantially horizontal support bar adapted for supporting the at least one garment or garment hanger and including a top surface, a bottom surface, and a peripheral edge;
at least one substantially vertical support post each fixed at a top end thereof with the bottom surface of the support bar;
an enclosure well adapted to receive all but the top surface of the support bar therein, an open side of the enclosure well adapted for mounting flush with the top surface of the vehicle seat; and
at least one post receiver each fixed to a bottom portion of the enclosure well and adapted to receive a bottom end of one of the at least one support post therein, each post receiver contacting the support post with a friction fit such that the support bar and the support post are selectively vertically positionable;
whereby when the enclosure well is mounted flush with the top surface of the vehicle seat, the support bar may be lowered to a stowed position flush with the top surface of the vehicle seat, and then placed into a deployed position to provide a support for the at least one garment or garment hanger.

2. The support mechanism of claim 1 further including a trim plate having an aperture through which the enclosure well fits and is frictionally retained therein, the trim plate being adapted for fixing with the top surface of the vehicle seat.

3. The support mechanism of claim 1 wherein the bottom surface of the support bar includes a plurality of downwardly-projecting hooks each for receiving one of the garment hangers.

4. The support mechanism of claim 1 wherein the bottom surface of the support bar includes a plurality of downwardly-projecting loops each for receiving one of the garment hangers.

5. The support mechanism of claim 1 wherein each post receiver includes a toggle lock mechanism that toggles between a lowered position corresponding to the top surface of the support bar being flush with the top surface of the vehicle seat, and a raised position corresponding to the top surface of the support bar being raised above the top surface of the vehicle seat for allowing gripping of the support bar, the toggle lock mechanism being toggled by depressing the support bar.

6. The support mechanism of claim 1 wherein at least one post receiver includes a clamp lock to fix the support post in position with respect to the post receiver until an actuator thereof is manually actuated to release the support post to allow vertical movement, the support post further including at least one locking groove for cooperation therewith.

7. The support mechanism of claim 1 wherein each post receiver includes an elastomeric ring adapted to frictionally contact one of the support posts.

8. The support mechanism of claim 1 wherein the top surface of the support bar includes a plurality of transverse grooves adapted for retaining one of the garment hangers therein by gravity.

9. The support mechanism of claim 8 wherein the peripheral edge of the support bar further includes at least one finger section to allow manual gripping and raising of the support bar.

10. The support mechanism of claim 8 wherein the support bar further includes at least one extension segment that is extendible between a retracted position and an extended position, each extension segment adapted to support at least one garment or garment hanger thereon.

11. The support mechanism of claim 10 wherein each extension segment is slidably extendible between the retracted position and the extended position.

12. The support mechanism of claim 10 wherein each extension segment is pivotally extendible between the retracted position and the extended position.

13. A support mechanism for at least one garment or garment hanger and for integration into a top surface of a vehicle seat, comprising:
a pair of horizontal support bars each adapted for supporting at least one garment or garment hanger and including a top surface, a bottom surface, a distal end, a proximal end, and a peripheral edge;
a substantially vertical support post fixed at a top end thereof with the proximal ends of each support bar at a pivot mechanism;
an enclosure well adapted to receive all but the distal ends of the support bars therein, the enclosure well adapted for mounting flush with the top surface of the vehicle seat; and
a post receiver fixed to a bottom portion of the enclosure well and adapted to receive a bottom end of the support post therein, the post receiver contacting the support post with a friction fit such that the support bars and the support post are selectively vertically positionable;
whereby when the enclosure well is mounted flush with the top surface of the vehicle seat, the support bars may be lowered to a stowed position such that the distal ends thereof are flush with the top surface of the vehicle seat, and then placed into a deployed position to provide a T-shaped support for the at least one garment or garment hanger.

14. The support mechanism of claim 13 wherein the bottom surface of each support bar includes a plurality of downwardly-projecting hooks each for receiving one of the garment hangers.

15. The support mechanism of claim 13 wherein the bottom surface of each support bar includes a plurality of downwardly-projecting loops each for receiving one of the garment hangers.

16. The support mechanism of claim 13 wherein the post receiver includes a toggle lock mechanism that toggles between a lowered position corresponding to the distal ends of each support bar being flush with the top surface of the vehicle seat, and a raised position corresponding to the distal ends of each support bar being raised above the top surface of the vehicle seat for allowing gripping of the support bars, the toggle lock mechanism being toggled by depressing the distal ends of each support bar.

17. The support mechanism of claim 13 wherein the top surface of each support bar includes a plurality of transverse grooves adapted for retaining one of the garment hangers therein by gravity when the support bars are in the deployed position.

* * * * *